UNITED STATES PATENT OFFICE.

GEORGE H. MAISCH, OF BALTIMORE, MARYLAND.

MANUFACTURE OF INCANDESCENT MANTLES.

SPECIFICATION forming part of Letters Patent No. 712,562, dated November 4, 1902.

Application filed November 9, 1901. Serial No. 81,752. (No specimens.)

*To all whom it may concern:*

Be it known that I, GEORGE H. MAISCH, a citizen of the United States, residing at Baltimore, State of Maryland, have invented certain new and useful Improvements in Manufacture of Incandescent Mantles; and I do hereby declare the following to be a full, clear, and exact description of the invention, such as will enable others skilled in the art to which it appertains to make and use the same.

My invention relates to certain new and useful improvements in the manufacture of mantles for incandescent lighting, and has for its object to very greatly increase the durability of such bodies, so that they will be less liable to rupture or destruction by jars or jolts or by the explosion incident to the ignition of the flame of gas or vapor employed for the burner.

It is characteristic of my invention that the greater durability and inherent strength of the mantle is also accompanied with very high candle-power, equaling and in some cases exceeding the candle-power of the best commercial forms of rare-earth mantles.

In carrying out my invention I follow a procedure which results in the production upon and within the body of the mantle of what I call a "glaze-enamel." This glaze-enamel I preferably compound of the following materials: feldspar, 1.75; pure flint, 1.25; whiting, 0.60; china-clay, 0.75; carbonate of lead, 1.25. This glaze-enamel I may employ in a number of different ways in the practice of my invention. For instance, I may dissolve the compound in water in an amount sufficient to give a milky appearance to the water, whereupon I filter it through a fabric of fine silk lawn. I then combine the filtrate with a "rare-metal" dipping solution for incandescent mantles consisting, for instance, of the following ingredients, to wit: nitrate of thorium, one hundred; nitrate of cerium, 0.66; nitrate of magnesium, five; nitrate of beryllium, five; nitrate of cobalt, 0.50. The quantity of the glaze-enamel to be added to the rare-metal solution is usually about one-fourth by weight; but the proportion may be varied without departing from the spirit of my invention. The mixture of the glaze-enamel and the rare-metal solution is in this instance employed in the usual manner familiar to the art for the manufacture of incandescent mantles.

Instead of mixing the glaze-enamel with the rare-metal solution before treating the stockinet or other fabric from which the mantles are made I may practice my invention by first producing a rare-earth mantle in the ordinary way by the employment of the nitrate solution above specified, whereupon I may dip the rare-earth mantle so produced into water containing a sufficient quantity of the glaze-enamel to impart to the water a milky appearance. I then dry the mantle and finally heat it at a high temperature over a high-pressure Bunsen flame, which will have the effect of hardening the glaze and fixing it upon the mantle. Furthermore, I may practice my invention by first placing all of the ingredients of the glaze-enamel in a crucible and subjecting the crucible to high heat, with the result of obtaining a very pure crystal glass. I may then grind this glass to a fine powder, and after adding sufficient of the fine powder to water to give the water a milky appearance I filter and add the filtrate to the solution of rare-metal earths hereinbefore specified in such quantity that the resultant mixture shall itself constitute a thirty-per-cent. solution. The stockinet or webbing is then to be dipped into this solution in the usual way and after drying is burned over a high-pressure Bunsen-burner flame in the customary manner.

Mantles produced in accordance with my invention are exceptionally strong and durable. They will support themselves without breaking in either an upright position or if placed on their sides, and they may even be rolled backward and forward in the hand or may be held up by their lower edge without injury, and they are particularly resistant to all of the usual jars or shocks to which mantles are subjected when in use or at the time when the flame of artificial or natural gas or gasolene-vapor supplying the burner is ignited. At the same time they are of high candle-power and produce a lustrous and brilliant light.

While I prefer to employ the particular rare-metal solution hereinbefore indicated, yet I do not restrict myself thereto, inasmuch as other rare-metal solutions may be employed with advantageous results. Nevertheless, I may say that I regard the employment of cobalt as of particular advantage in obtaining a high degree of luster for the mantle, and I use beryllium for the reason that I have found that it deprives the glaze-enamel of any brittleness which it might otherwise possess.

Having thus described my invention, what I claim is—

1. An incandescent mantle made up of oxids of rare metals, in combination with a glaze-enamel, substantially as described.

2. An incandescent mantle made up of oxids of the rare metals including beryllium, in combination with a glaze-enamel, substantially as described.

3. An incandescent mantle made up of oxids of rare metals and oxid of cobalt, in combination with a glaze-enamel, substantially as described.

4. An incandescent mantle made up of oxids of rare metals including beryllium, in combination with oxid of cobalt and a glaze-enamel, substantially as described.

5. An incandescent mantle made up of oxids of thorium, cerium, beryllium, magnesium, and cobalt, in combination with a glaze-enamel, substantially as described.

6. An incandescent mantle made up of oxids of rare metals in combination with a glaze-enamel, said enamel made from feldspar, flint, whiting, china-clay, and carbonate of lead, substantially as described.

7. An incandescent mantle made up of oxids of thorium, cerium, beryllium, magnesium, and cobalt, in combination with a glaze-enamel, made from feldspar, flint, whiting, china-clay, and carbonate of lead, substantially as described.

In testimony whereof I affix my signature in presence of two witnesses.

GEORGE H. MAISCH.

Witnesses:
MAURICE S. TALL,
JOHN M. UHTHOFF.